(12) United States Patent
Pederson

(10) Patent No.: US 6,431,932 B1
(45) Date of Patent: Aug. 13, 2002

(54) WATER BOARD, AND METHOD OF WATER BOARDING

(76) Inventor: Arne Pederson, 172 Huntham Road NE, Calgary, Alberta (CA), T2K 4G1

( * ) Notice: Subject to any disclaimer, the term of this patent is extended or adjusted under 35 U.S.C. 154(b) by 0 days.

(21) Appl. No.: 09/734,875

(22) Filed: Dec. 13, 2000

(51) Int. Cl.$^7$ .................................................. B63B 1/00
(52) U.S. Cl. ........................................................... 441/65
(58) Field of Search ...................... 441/65, 74; 114/253

(56) References Cited

U.S. PATENT DOCUMENTS

| | | |
|---|---|---|
| 1,615,568 A | 1/1927 | Caroll |
| 3,145,400 A | 8/1964 | Yoakum |
| 3,237,222 A | 3/1966 | Frost |
| 4,293,968 A | 10/1981 | Levine |
| D263,860 S | 4/1982 | Cole |
| 5,617,809 A | 4/1997 | Arango |
| 5,970,900 A | 10/1999 | Sheldon |
| 6,042,439 A | 3/2000 | Parten |

*Primary Examiner*—Ed Swinehart
(74) *Attorney, Agent, or Firm*—I. Zborovsky

(57) ABSTRACT

A water board has a board member having a front, a rear, and two sides, holding unit to be held by a user standing on the board member, and arranged in an area of the front of the board member, and a fixing unit for fixing the board member to a stationary object and arranged also in an area of the front, so that when the fixing unit is used for affixing the board member to a stationary object, and a user stands on the board member and holds the holding unit, a user can maneuver the board under the action of movement and force of a river water.

5 Claims, 1 Drawing Sheet

WATER BOARD, AND METHOD OF WATER BOARDING

BACKGROUND OF THE INVENTION

The present invention relates to a water board and a method of water boarding.

Traditional forms of water boarding include surf boarding, knee boarding, and paddle boarding. In surf boarding the motive force is supplied by the waves or surf. In knee boarding, the force is supplied by a boat or other water craft. In paddle boarding the force is applied manually through the use of paddles. Corresponding devices for these types of boarding are disclosed in U.S. Pat. Nos. 1,615,568; 3,145,400; 3,237,222; 4,293,968; 4,986,784; 5,617,809; 5,970,900; 6,042,439; and U.S. Pat. No. D 263,860. It is believed to be advisable to provide other water boards and methods of water boarding.

SUMMARY OF THE INVENTION

Accordingly, it is an object of present invention to provide a new water board and a new method of water boarding.

More particularly, it is an object of present invention to provide a device and a method of water boarding which allows the use of the motive force which is supplied by the movement of water in a river.

In keeping with these objects and with others which will become apparent hereinafter, one feature of present invention resides, briefly stated, in a water board which has a board member having a front, a rear, and two sides; holding means to be held by a user standing on said board member, said holding means being arranged in an area of said front of said board member; and a fixing means for fixing said board member to a stationary object, said fixing means being arranged also in an area of said front, so that when said fixing means are used for affixing said board member to a stationary object, and a user stands on said board member and holds said holding means, a user can maneuver the board under the action of movement and force of a river water.

In accordance with another feature of present invention, a method of water boarding is provided which includes providing a board member having a front, a rear, and two sides; using holding means to be held by a user standing on said board member, said holding means being arranged in an area of said front of said board member; and fixing said board member by fixing means to a stationary object, said fixing means being arranged also in an area of said front, so that when said fixing means are used for affixing said board member to a stationary object, and a user stands on said board member and holds said holding means, a user can maneuver the board under the action of movement and force of a river water.

When the water board is designed and a method of water boarding is performed in accordance with the present invention, the motive force is supplied by the movement of water in a river. The board is tied to a stationary object, such as a tree or a bridge. The movement and force of the river water is sufficient to allow maneuvering of the board along the surface of the river. From the shoreline, a rider would appear to be stationary.

A rider can stand, kneel or sit on the board member which is affixed to a stationary object, and hold onto a handle for stability.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
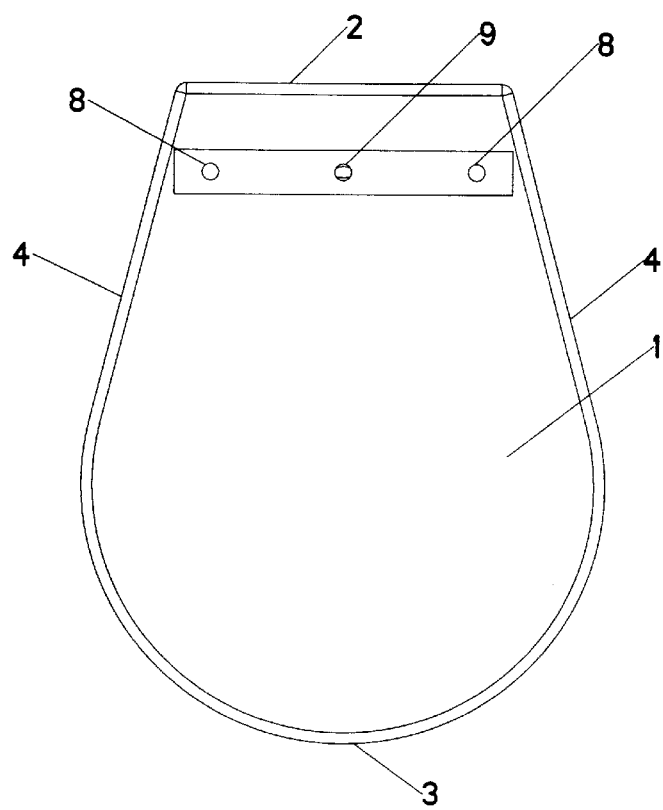
FIG. 1 is a plan view of a board member of a water board in accordance with the present invention.

A water board in accordance with the present invention has a board member which is identified with reference numeral 1. The board member 1 on a plan view generally has a tear drop shape. It has a front identified with reference numeral 2, a rear identified with reference numeral 3 and two sides identified with reference numeral 4. The front 2 has a substantially straight front edge. The sides 4 can be formed by inclined edges which diverge from the front 2 towards the rear 3, and the rear 3 can be formed by a curved edge.

The tear drop shape allows increased maneuverability. The curved rear edge allows the user to "carve" the water. In "carving", a user shifts his weight to one side of the board member. This will increase the friction of this side of the board, resulting in the board moving laterally across the river bound only by the length of an affixing element which will be described later. The curved rear shape is the most effective for "carving".

The water board further has holding means which is identified as a whole with reference numeral 5. The holding means 5 have a handle 6 which is attached to the board member 1 for example by ropes. The ropes can be composed of nylon. The ropes 7 are connected to the board member in connecting points 8 formed for example as holes. The ropes can be passed through the holes and then tied.

The water board is further provided with affixing means which affix the water board to a stationary object, for example to a tree or a bridge. The affixing means include a connecting point formed for example as a hole 9. A line or a rope 10 can be connected to the board member 1 through the hole 9, for example by an eye ball which is screwed through the hole 9. As can be seen from the drawings, the point of connection of the affixing line or rope is located between the points of connection of the ropes connected to the handle, preferably equidistantly. Preferably, all points are located on the same transverse line. This is important for the stability of a user and a water boarding process. The board member 1 and the handle 6 can be coated with a marine grade varnish or paint.

The board member 1 is formed of and designed so as to have a lower buoyancy than existing surf, knee or paddle boards. Therefore if a user stands on the board member in still water, he will sink. It is the force of the river causing the board to "plane" that keeps the user on the surface. This lower buoyancy allows a user to shift his weight to the front of the board causing it and the user to sink below the surface of the water. The user can shift his body to the back of the board causing it to rise quite rapidly to or above the surface.

Once the user has "popped" back up, he can travel over the surface of water. This movement can be referred to as a "airtime".

A plywood, finished with marine quality varnish gives the bouncy to accomplish this objective. However, injection foam, plastic, fiberglass, etc., can be used to provide similar properties.

As can be seen from the drawings, an additional reinforcing transverse member 11 can be arranged on the board member 1 in the region of the front, and the holes 8 and 9 can extend through the transverse member as well.

Figure 2:
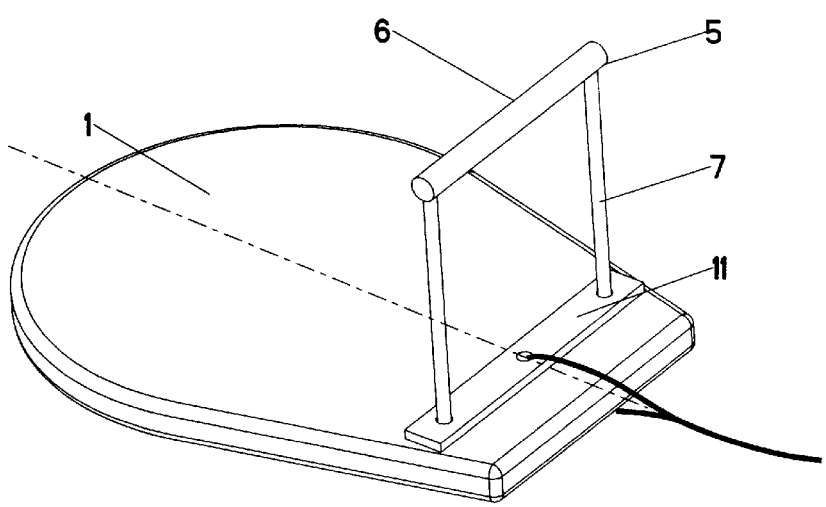
FIG. 2 is a perspective view of the water board in accordance with the present invention.
Figure 3:
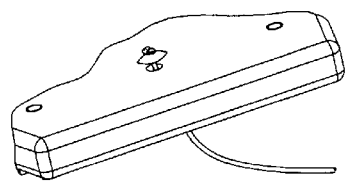
FIG. 3 shows a further embodiment of the present invention.

FIG. 2 shows a further embodiment of the invention. In this embodiment the rope 10 passes through the hole 9 in the board, so that it extends along a bottom of the board and is introduced into the hole 9 from the bottom side of the board. This makes the "planning" of the board more effective, since the rope will actually lift the front of the board a little.

It will be understood that each of the elements described above, or two or more together, may also find a useful application in other types of methods and constructions differing from the types described above.

While the invention has been illustrated and described as embodied in water board, and method of water boarding, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of water boarding, comprising the steps of providing a board member having a straight front extending transversely to a longitudinal axis, a continuous uninterrupted concavely curving rear, and two straight sides diverging symmetrically from said straight front to said curved rear; using holding means to be held by a user standing on said board member in an area of said front of said board member and connected to said board member in two connecting points which are rearwardly spaced from said front and spaced from one another transversely to the longitudinal axis; and affixing said board member by affixing means to a stationary object also in an area of said front in a point located between said points of connection of said holding means to said board member, so that when said affixing means is used for affixing said board member to a stationary object and a user stands on said board member and holds said holding means attached in said two connecting points and said board is affixed to said stationary object in said point located between said connecting points, a user can hold said holding means and can maneuver the board under the action of movement and force of a river water.

2. A method as defined in claim 1, wherein said point of connecting of said affixing means which is located between said two connecting points of connection of said holding means on a single straight line extending through all said three points and perpendicularly to the longitudinal axis.

3. A water board as defined in claim 1, wherein said board has a thoroughgoing hole in said affixing point, said affixing means including an affixing member which extends from below of said board completely through said thoroughgoing hole and is fixed above said board and above said thoroughgoing hole by a knot on said affixing member.

4. A water board, comprising a board member having a straight front extending transversely to a longitudinal axis, a convexly curved continuous uninterrupted rear, and two straight sides diverging from said front to said rear; holding means to be held by a user standing on said board member and arranged in an area of said front of said board member, said holding means being connected to said board member in two connecting points which are spaced rearwardly from said front and spaced from one another transversely to said longitudinal axis; and affixing means for affixing said board member to a stationary object and also arranged in an area of said front, said affixing means being affixed to said board in a point located between said connecting points in which said holding means is connected to said board, so that when and a user stands on said board member and holds said holding means connected in said connecting points with said board and said board is affixed by said affixing means in said point located between said connecting points, a user can maneuver the water board under the action of movement and force of a river water.

5. A method as defined in claim 4, wherein said point of connection of said affixing means which is located between said two connecting points of connection of said holding means on a single straight line extending through all said three points perpendicular to this longitudinal axis.

* * * * *